US009623956B2

(12) United States Patent
Isotani et al.

(10) Patent No.: US 9,623,956 B2
(45) Date of Patent: Apr. 18, 2017

(54) HIGH-LIFT DEVICE OF FLIGHT VEHICLE

(71) Applicants: THE SOCIETY OF JAPANESE AEROSPACE COMPANIES, Tokyo (JP); KAWASAKI JUKOGYO KABUSHIKI KAISHA, Kobe-shi, Hyogo (JP)

(72) Inventors: Kazuhide Isotani, Kakamigahara (JP); Kenji Hayama, Kakamigahara (JP)

(73) Assignees: THE SOCIETY OF JAPANESE AEROSPACE COMPANIES, Tokyo (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/052,472

(22) Filed: Feb. 24, 2016

(65) Prior Publication Data
US 2016/0194073 A1    Jul. 7, 2016

Related U.S. Application Data

(62) Division of application No. 14/008,139, filed as application No. PCT/JP2012/002135 on Mar. 28, 2012, now Pat. No. 9,302,761.

(30) Foreign Application Priority Data

Mar. 30, 2011    (JP) ................ 2011-074795

(51) Int. Cl.
*B64C 23/06* (2006.01)
*B64C 9/18* (2006.01)
(Continued)

(52) U.S. Cl.
CPC .......... *B64C 9/18* (2013.01); *B64C 3/58* (2013.01); *B64C 9/16* (2013.01); *B64C 9/28* (2013.01);
(Continued)

(58) Field of Classification Search
USPC ....... 244/199.2, 199.1, 200, 1 N, 198, 199.4, 244/200.1
See application file for complete search history.

(56) References Cited

U.S. PATENT DOCUMENTS

| 1,767,944 A | 6/1930 | Schleusner |
| 2,163,655 A | 6/1939 | Zimmerman |
(Continued)

FOREIGN PATENT DOCUMENTS

| JP | S62-299496 A | 12/1987 |
| JP | 2009-516615 A | 4/2009 |
(Continued)

OTHER PUBLICATIONS

Jun. 5, 2012 International Search Report issued in International Patent Application No. PCT/JP2012/002135.
(Continued)

*Primary Examiner* — Christopher P Ellis
(74) *Attorney, Agent, or Firm* — Oliff PLC

(57) ABSTRACT

A high-lift device of a flight vehicle includes: a flap main body provided at a trailing edge portion of a main wing of the flight vehicle so as to be extracted from and be retracted in the trailing edge portion and extending in a wing span direction of the main wing; and a vortex suppressing portion provided at a tip end portion of the flap main body in a wing span direction of the flap main body and configured to suppress a vortex rolling up from a lower surface of a tip end portion of the flap main body to an upper surface of the tip end portion.

8 Claims, 9 Drawing Sheets

(51) Int. Cl.
   *B64C 9/28* (2006.01)
   *B64C 21/02* (2006.01)
   *B64C 3/58* (2006.01)
   *B64C 9/16* (2006.01)

(52) U.S. Cl.
   CPC .......... *B64C 21/02* (2013.01); *B64C 2230/22* (2013.01); *Y02T 50/166* (2013.01); *Y02T 50/44* (2013.01)

(56) References Cited

U.S. PATENT DOCUMENTS

| | | |
|---|---|---|
| 3,578,264 A | 5/1971 | Kuethe |
| 3,692,259 A | 9/1972 | Yuan |
| 4,131,252 A | 12/1978 | Dean et al. |
| 4,477,042 A | 10/1984 | Griswold, II |
| 4,522,360 A | 6/1985 | Barnwell et al. |
| 5,158,251 A | 10/1992 | Taylor |
| 5,253,828 A | 10/1993 | Cox |
| 5,505,409 A | 4/1996 | Wells et al. |
| 5,749,546 A | 5/1998 | Blackner et al. |
| 5,806,807 A | 9/1998 | Haney |
| 5,871,174 A | 2/1999 | Hannay |
| 5,927,645 A | 7/1999 | Latz |
| 6,283,406 B1 | 9/2001 | Remington et al. |
| 6,491,260 B2 | 12/2002 | Borchers et al. |
| 7,484,930 B2 | 2/2009 | Hutcheson et al. |
| 7,753,316 B2 | 7/2010 | Larssen et al. |
| 8,096,513 B2 | 1/2012 | Mau et al. |
| 8,657,236 B2 | 2/2014 | Trich s, Jr. et al. |
| 8,695,915 B1 | 4/2014 | Jones et al. |
| 8,870,124 B2 | 10/2014 | Ireland |
| 2003/0132351 A1 | 7/2003 | Billman et al. |
| 2004/0129838 A1 | 7/2004 | Lisy et al. |
| 2005/0061921 A1 | 3/2005 | Egolf |
| 2006/0006290 A1 | 1/2006 | Loth |
| 2007/0114329 A1 | 5/2007 | Lacy et al. |
| 2009/0084905 A1 | 4/2009 | Mau et al. |
| 2009/0146017 A1 | 6/2009 | Lacy et al. |
| 2010/0187366 A1 | 7/2010 | Gupta et al. |
| 2012/0256049 A1 | 10/2012 | Shmilovich et al. |

FOREIGN PATENT DOCUMENTS

| | | |
|---|---|---|
| JP | 2009-154756 A | 7/2009 |
| JP | 2009-527405 A | 7/2009 |
| WO | 91/01247 A1 | 2/1991 |
| WO | 2008/124901 A2 | 10/2008 |

OTHER PUBLICATIONS

Jun. 17, 2014 Office Action issued in Japanese Patent Application No. 2013-507183.

Aug. 19, 2016 Office Action issued in Canadian Patent Application No. 2,937,135.

Jul. 5, 2016 Office Action issued in U.S. Appl. No. 15/052,497.

HIGH-LIFT DEVICE OF FLIGHT VEHICLE

This is a Division of application Ser. No. 14/008,139 filed Sep. 27, 2013, which is a National Phase of International Application No. PCT/JP2012/002135 filed Mar. 28, 2012, which claims priority to Japanese Application No. 2011-074795 filed Mar. 30, 2011. The disclosure of the prior applications is hereby incorporated by reference herein in their entireties.

TECHNICAL FIELD

The present invention relates to a high-lift device provided at a trailing edge portion of each main wing of a flight vehicle so as to be able to be extracted from and be retracted in the trailing edge portion of the main wing.

BACKGROUND ART

A flight vehicle includes high-lift devices provided at main wings. The high-lift devices are retracted in the main wings while the flight vehicle is cruising. The high-lift devices are extracted from the main wings when the flight vehicle is about to take off or land. Since the high-lift devices are aerodynamic devices for securing lift during flight at low speed, they are designed with emphasis on aerodynamic characteristics.

In recent years, there is an increasing demand for a reduction in noises generated from the flight vehicle when the flight vehicle is about to take off or land. Under such circumstance, the high-lift device is recognized as one major noise source especially when the flight vehicle is about to land. Here, proposed is a high-lift device produced in consideration of the reduction in aerodynamic noises. For example, PTL 1 discloses a noise reduction device configured such that air currents are ejected through holes formed on an upper surface, side surface, and lower surface of each main wing.

CITATION LIST

Patent Literature

PTL 1: U.S. Pat. No. 7,484,930

SUMMARY OF INVENTION

Technical Problem

According to the above-described noise reduction device, to eject the air currents, a pneumatic source needs to be provided near the main wing. In a case where a dedicated compressor is applied to the pneumatic source, the entire device becomes large, and an airframe of the flight vehicle increases in weight. In addition, pipes through which the air is introduced from the pneumatic source to the holes need to be provided inside a flap. In the case of providing such a complex mechanism, the weight increases, and in addition, works, such as inspections and maintenances, required to maintain the airframe increase. Therefore, the practicality deteriorates.

Here, an object of the present invention is to suitably reduce aerodynamic noises generated from a high-lift device without increasing the weight of an airframe as much as possibly and deteriorating the practicality.

Solution to Problem

In the process of analyzing the mechanism of noises generated from a high-lift device of a flight vehicle, the present inventors have obtained findings that there is a possibility that: a vortex rolling up from a lower surface of a tip end portion of a flap main body of the high-lift device to an upper surface of the tip end portion of the flap main body at the tip end portion of the flap main body exists at a position close to a surface of the tip end portion of the flap; the pressure on the surface of the flap fluctuates by the fluctuations in the strength and position of the vortex with time; and thus, the aerodynamic noises are generated. Here, the present inventors have found out that suppressing the strength of the vortex, suppressing the fluctuations in the strength and position of the vortex with time, and avoiding the interference between the vortex and the flap main body by separating these from each other are effective to reduce the aerodynamic noises generated from the high-lift device. Thus, a below-described high-lift device of a flight vehicle was made.

To be specific, a high-lift device of a flight vehicle according to the present invention includes: a flap main body provided at a trailing edge portion of a main wing of the flight vehicle so as to be extracted from and be retracted in the trailing edge portion and extending in a wing span direction of the main wing; and a vortex suppressing portion provided at a tip end portion of the flap main body in a wing span direction of the flap main body and configured to suppress a vortex rolling up from a lower surface of the tip end portion of the flap main body to an upper surface of the tip end portion of the flap main body.

According to the above configuration, the vortex suppressing portion has an effect of: suppressing the strength of the vortex rolling up from the lower surface of the tip end portion of the flap main body to the upper surface of the tip end portion of the flap main body; suppressing the fluctuations in the strength and position of the vortex with time; or causing the position of the vortex to be separated from the flap main body. With this, the aerodynamic noises generated from the high-lift device can be suitably reduced.

The vortex suppressing portion may be formed by partially cutting out the tip end portion of the flap main body. According to the above configuration, the generation of the vortex can be suppressed only by simply changing the shape of the tip end portion of the flap main body.

The vortex suppressing portion may be formed by partially cutting out the tip end portion of the flap main body such that a trailing edge end of the tip end portion of the flap main body projects toward a tip end side in the extending direction more than a leading edge end of the tip end portion of the flap main body. According to the above configuration, the lift generated at the vortex suppressing portion of the flap main body decreases toward the tip end side in the extending direction. Therefore, the strength of the vortex generated at the tip end portion of the flap main body and rolling up from the lower surface side to the upper surface side is made lower than that in a case where there is no projection.

The vortex suppressing portion may be formed by partially cutting out the tip end portion of the flap main body such that a leading edge end of the tip end portion of the flap main body projects toward a tip end side in the extending direction more than a trailing edge end of the tip end portion of the flap main body. According to the above configuration, the lift generated at the vortex suppressing portion of the flap main body decreases toward the tip end side in the extending direction. Therefore, the strength of the vortex generated at the tip end portion of the flap main body and rolling up from the lower surface side to the upper surface side is suppressed.

The vortex suppressing portion may be formed by partially cutting out the tip end portion of the flap main body such that: the tip end portion of the flap main body decreases in thickness as it extends toward a tip end side in the extending direction; and an angle between an upper-surface-side surface of the tip end portion of the flap main body and a lower-surface-side surface of the tip end portion of the flap main body becomes 60° or smaller. According to the above configuration, since the area of the side end surface of the tip end portion of the flap main body becomes small, the flow separation caused at the side end surface is little, so that the fluctuation in the strength of the vortex with time can be suppressed. Further, in a case where the shape of the upper surface side of the flap main body is changed when setting the shape of the flap main body such that the thickness of the tip end portion of the flap main body decreases toward the tip end side in the extending direction, the vortex rolling up from the lower surface side to the upper surface side can be separated from the surface of the flap main body. Therefore, the vortex can be suitably prevented from interfering with the flap main body. With this, the aerodynamic noises generated from the high-lift device can be suitably reduced.

The vortex suppressing portion may be a flow suppressing portion formed at an upper surface side in the vicinity of a leading edge of the tip end portion of the flap main body and configured to cause a flow along the upper surface of the tip end portion of the flap main body to be separated from the upper surface. According to the above configuration, at the leading edge portion of the tip end portion of the flap main body, the flow suppressing portion locally separates the flow on the flap upper surface from the surface of the flap main body. With this, the lift generated at the vortex suppressing portion of the flap main body decreases. Therefore, the strength of the vortex rolling up from the lower surface side to the upper surface side at the side edge portion of the tip end portion of the flap main body can be decreased. Thus, the aerodynamic noises generated from the high-lift device can be suitably suppressed.

The vortex suppressing portion may include: a ventilation structure provided at at least one of an upper end surface and side end surface of the tip end side of the flap main body; and a cavity formed inside the tip end portion of the flap main body. According to the above configuration, even in a case where the vortex rolling up from the lower surface side is generated at the tip end portion of the flap main body, strong pressure variations generated on the surface of an object can be buffered by causing the inside of the cavity and the air currents to partially communicate with each other through the ventilation structure provided at at least one of the upper end surface and side end surface of the flap main body. Therefore, the aerodynamic noises generated by the interference between the vortex and the flap main body can be suitably reduced. Further, a porous material may be provided in the cavity. The aerodynamic noises can be suitably suppressed by converting the fluctuation in the air currents generated in the cavity into heat energy by the porous material.

The vortex suppressing portion may be a flow suppressing portion formed at a leading edge portion of the tip end portion of the flap main body, close to and opposed to a lower surface of the main wing in a state where the flap main body is being extracted from the main wing, and causes a flow along an upper surface of the tip end portion of the flap main body to be separated from the upper surface. According to the above configuration, at the leading edge portion of the tip end portion of the flap main body, the flow suppressing portion narrows a passage between the upper surface of the tip end portion of the flap main body and the lower surface of the main wing. With this, the flow on the upper surface of the flap is locally separated from the upper surface. Therefore, the lift generated at the vortex suppressing portion of the flap main body decreases. Thus, the strength of the vortex rolling up from the lower surface side to the upper surface side at the side edge portion of the tip end portion of the flap main body can be reduced. With this, the aerodynamic noises generated from the high-lift device can be suitably suppressed.

Advantageous Effects of Invention

According to the present invention, the aerodynamic noises generated from the high-lift device can be suitably reduced without increasing the weight of the airframe as much as possible and deteriorating the practicality.

DESCRIPTION OF EMBODIMENTS

Figure 1:
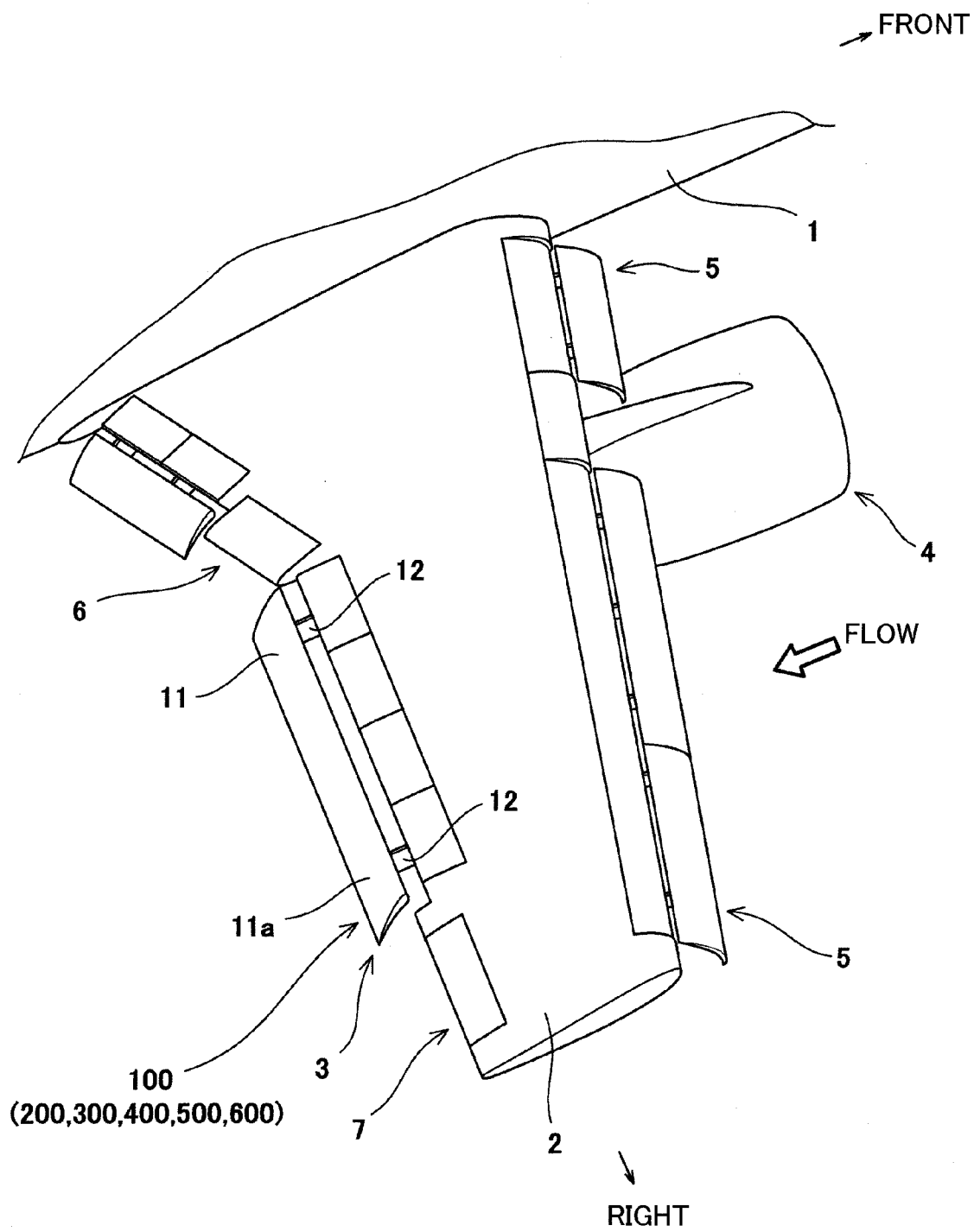
FIG. 1 is a perspective view showing a schematic configuration of a high-lift device of a flight vehicle according to an embodiment of the present invention.

Hereinafter, an embodiment of the present invention will be explained in reference to the drawings. In the following, directions will be explained on the basis that in a case where a nose of a flight vehicle is located at a front side, an airframe of the flight vehicle extends in a front-rear direction. In the drawings, the same reference signs are used for the same or corresponding components, and a repetition of the same detailed explanation is avoided.

Main Wing and High-Lift Device

FIG. 1 is a perspective view showing a schematic configuration of a high-lift device 3 of the flight vehicle according to an embodiment of the present invention. As shown in FIG. 1, the flight vehicle includes an airframe 1, a pair of left and right main wings 2 (FIG. 1 shows only the right main wing.), and the high-lift device 3. The airframe 1 extends in the front-rear direction. The pair of main wings 2 respectively extend to the left and the right from the airframe 1. The high-lift device 3 is provided at a trailing edge portion of the main wing 2. The high-lift device 3 according to the present embodiment is a slotted flap type or a fowler flap type. The high-lift device 3 is retracted in the main wing 2 and extracted from the main wing 2. In FIG. 1, reference sign 4 denotes a jet engine, reference sign 5 denotes a slat, reference sign 6 denotes an inner aileron, and reference sign 7 denotes an outer aileron.

The high-lift device 3 includes a flap main body 11 and link mechanisms 12. The flap main body 11 has an airfoil shape that is longer in a wing span direction than in a wing chord direction. The wing span direction of the flap main body 11 is substantially parallel to a wing span direction of the main wing 2. The link mechanisms 12 couple the flap main body 11 to the main wing 2 such that the flap main body 11 can swing. When the link mechanisms 12 are driven by an actuator, not shown, the flap main body 11 is retracted in the main wing 1 or extracted from the main wing 1 in accordance with the operations of the link mechanisms 12.

When the flap main body 11 is retracted in the main wing 2, a leading edge portion of the flap main body 11 is retracted in a lower side of the trailing edge portion of the main wing 2. A trailing edge portion of the flap main body 11 is exposed to the outside and partially constitute the trailing edge portion of the main wing 2. When the flap main body 11 is extracted from the main wing 2, the substantially entire flap main body 11 is provided so as to project beyond a trailing edge side of the main wing 2 in plan view.

Figure 2:
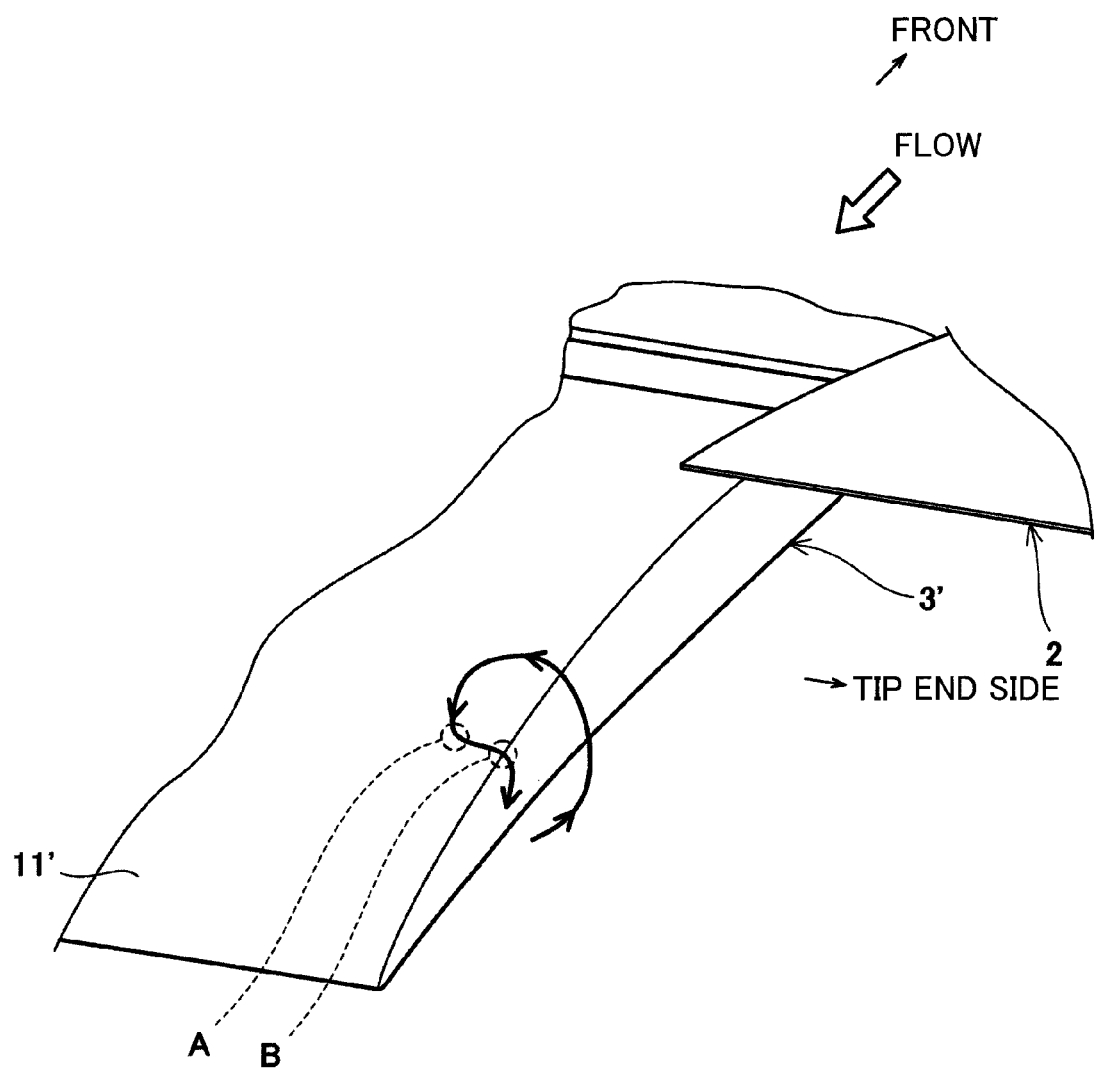
FIG. 2 is a perspective view of the high-lift device according to Conventional Example.

FIG. 2 is a partial perspective view of a high-lift device 3' according to Conventional Example. In the high-lift device 3' according to Conventional Example, an entire flap main body 11' is formed in a substantially rectangular shape in plan view. Therefore, a tip end portion of the flap main body 11' extends straight rearward from the trailing edge portion of the main wing 2 in plan view. A vortex rolling up from a lower surface side of the flap main body 11' through a tip end side of a side end surface of the flap main body 11' to an upper surface side of the flap main body 11' is generated at the tip end portion of the flap main body 11'.

When the high-lift device 3' is being extracted, the position of the vortex changes with time, and the strength of the vortex changes with time. In addition, the rolling-up vortex interferes with the upper surface of the flap main body 11', and the flow of the vortex is drastically bent at this interfering point toward the tip end side in the wing span direction (see a broken-line circle A). The vortex moving toward the tip end side in the wing span direction is separated from the surface of the flap main body 11' at a corner portion where the upper surface and side end surface of the flap main body 11' intersect with each other (see a broken-line circle B). With this, the flow becomes complex around the corner portion. Therefore, it is thought that when the high-lift device 3' is being extracted from the main wing 2, the aerodynamic noises are generated from the high-lift device 3'.

In the high-lift device 3 according to the present embodiment, the configuration of a tip end portion 11a (see FIG. 1) of the flap main body 11 is changed from that of Conventional Example. By this change in configuration, the high-lift device 3 is provided with a vortex suppressing portion 100 (200, 300, 400, 500, or 600) configured to suppress such a vortex. Hereinafter, the configurations of the vortex suppressing portions according to Examples will be explained in order. Then, noise reduction effects obtained by the vortex suppressing portions of Examples will be explained.

Example 1

Change in Planar Shape

Figure 3:
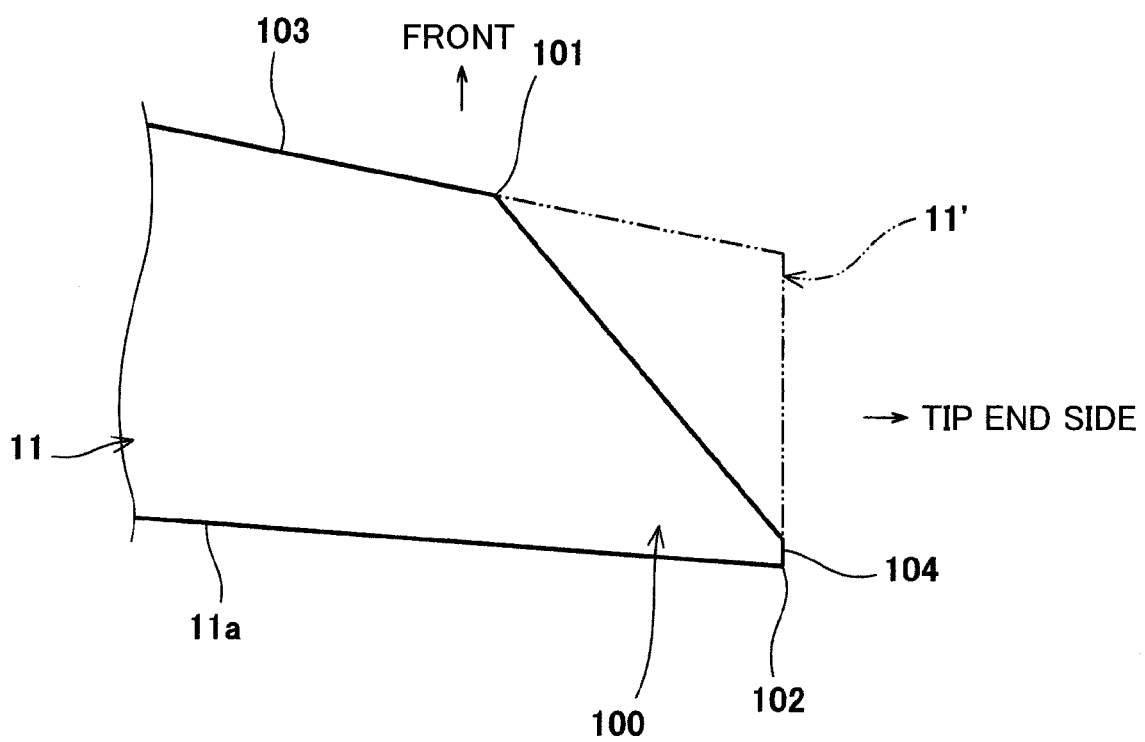
FIG. 3 is a partial plan view of a flap main body and shows a vortex suppressing portion according to Example 1 of the present invention.

FIG. 3 is a partial plan view of the flap main body 11 to which the vortex suppressing portion 100 according to Example 1 is applied. The vortex suppressing portion 100 according to Example 1 includes a leading edge end 101 and a trailing edge end 102. The leading edge end 101 is located closer to a tip end side of the flap main body 11 in the wing span direction than the trailing edge end 102.

In FIG. 3, the tip end portion of the flap main body 11' of Conventional Example is shown by a chain double-dashed line. As shown in FIG. 3, when considered based on the flap main body 11' according to Conventional Example having a rectangular shape in plan view, the vortex suppressing portion 100 according to Example 1 is formed by partially cutting out the tip end portion of the flap main body 11'. To be specific, the vortex suppressing portion 100 is formed by cutting off a leading edge 103 side of the tip end portion of the flap main body 11' such that the cut-out amount increases toward the tip end side.

With this, a wing chord length of the flap main body 11 decreases as the flap main body 11 extends toward the tip end. In a case where the shape of the tip end portion 11a of the flap main body 11 in plan view is changed as above, a lift distribution in the wing span direction changes. Since the lift acting on the flap main body 11 becomes comparatively small at a wing tip 104, the strength of the vortex rolling up from the lower surface side of the flap main body 11 to the upper surface side of the flap main body 11 can be suppressed. Therefore, the aerodynamic noises generated by the vortex can be reduced. In the example shown in FIG. 3, the leading edge end 101 and the trailing edge end 102 are connected to each other by two straight lines in plan view. However, this is just one example, and the leading edge end 101 and the trailing edge end 102 may be connected to each other by a single straight line or three or more straight lines in plan view or by drawing a curved line in plan view.

Example 2

Change in Planar Shape

Figure 4:
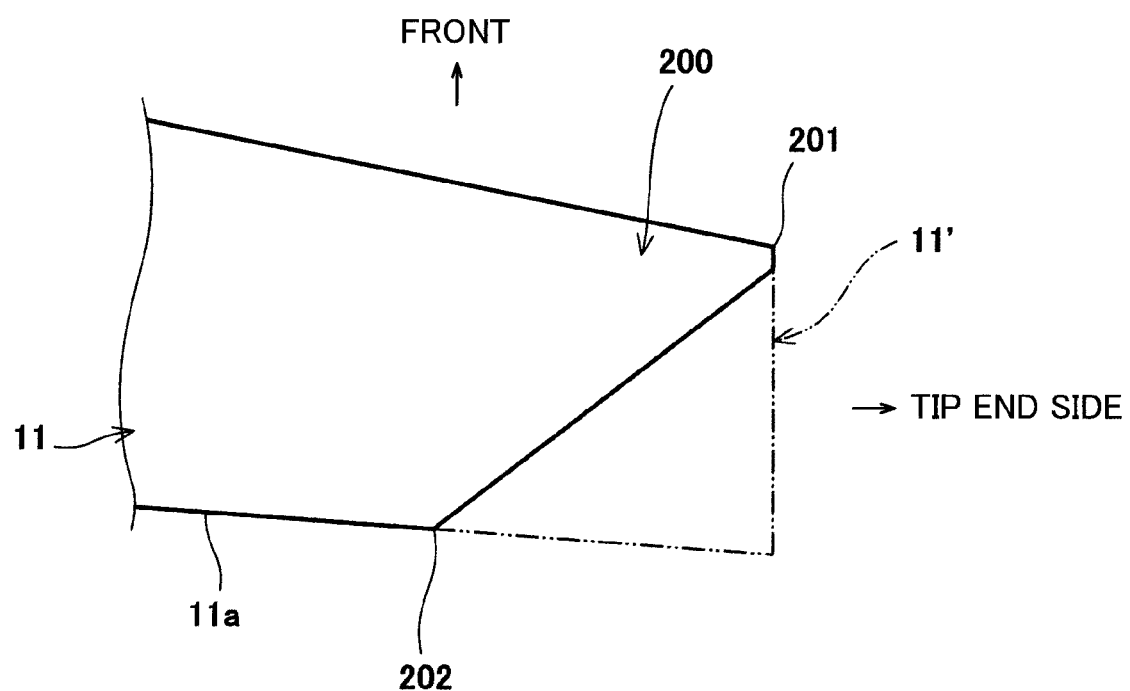
FIG. 4 is a partial plan view of the flap main body and shows the vortex suppressing portion according to Example 2 of the present invention.

FIG. 4 is a partial plan view of the flap main body 11 to which a vortex suppressing portion 200 according to Example 2 is applied. Unlike Example 1, in the vortex suppressing portion 200, a leading edge end 201 is located closer to the tip end side of the flap main body 11 in the wing span direction than a trailing edge end 202. When considered based on the flap main body 11' according to Conventional Example having a rectangular shape in plan view, the vortex suppressing portion 200 is formed by cutting off the tip end portion of the flap main body 11' such that the cut-out amount increases toward the tip end side.

Even in a case where the shape of the tip end portion 11a of the flap main body 11 in plan view is changed as above, the lift distribution in the wing span direction can be changed, so that the strength of the vortex can be suppressed. As with FIG. 3, in the example shown in FIG. 4, the leading edge end 201 and the trailing edge end 202 are connected to each other by two straight lines in plan view. However, this is just one example, and the leading edge end 201 and the trailing edge end 202 may be connected to each other by a single straight line or three or more straight lines in plan view or by drawing a curved line in plan view.

Example 3

Change in Cross-Sectional Shape of Wing Tip

Figure 5A:
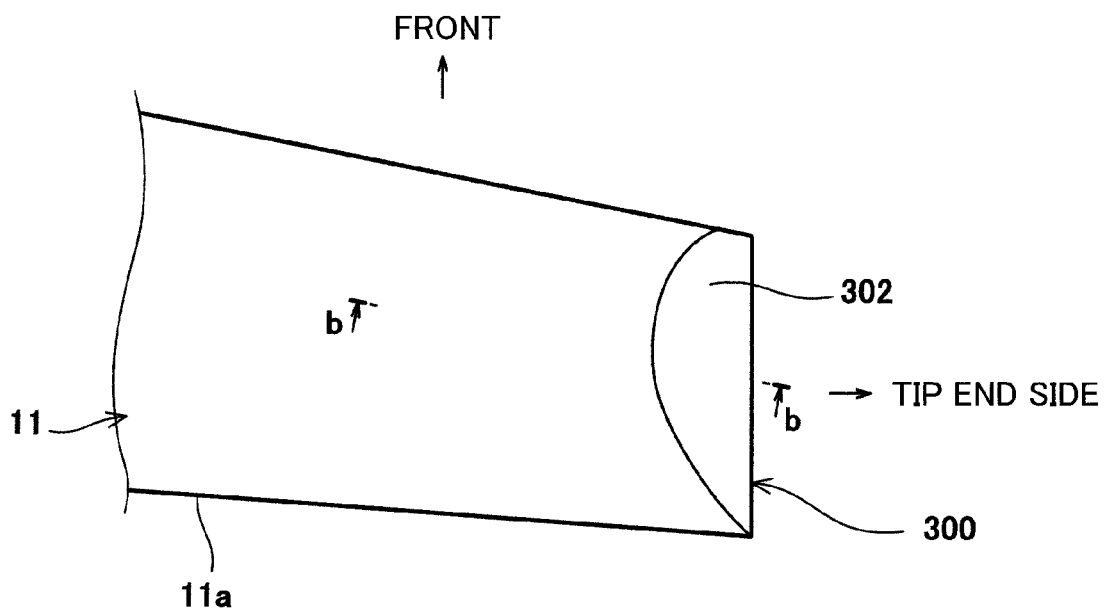
FIG. 5A is a partial plan view of the flap main body and shows the vortex suppressing portion according to Example 3 of the present invention.
Figure 5B:
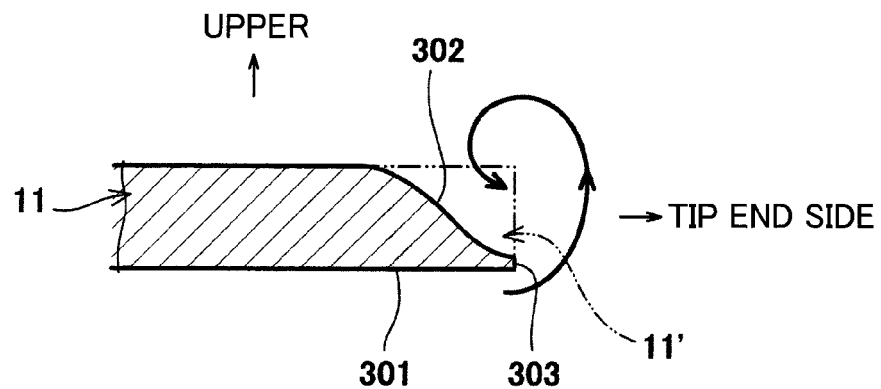
FIG. 5B is a partial cross-sectional view of the flap main body taken along line b-b of FIG. 5A.

FIG. 5A is a partial plan view of the flap main body 11 to which a vortex suppressing portion 300 according to Example 3 is applied. FIG. 5B is a partial cross-sectional view of the flap main body 11 taken along line b-b of FIG. 5A. In plan view, the vortex suppressing portion 300 is substantially the same in shape as the tip end portion of the flap main body 11' according to Conventional Example. However, the cross-sectional shape of the vortex suppressing portion 300 is different from that of the tip end portion of the flap main body 11' according to Conventional Example. In FIG. 5B, the flap main body 11' according to Conventional Example is shown by a chain line, and the vortex suppressing portion 300 according to Example 3 is shown by a solid line.

The vortex suppressing portion 300 is formed such that the tip end portion 11a of the flap main body 11 decreases in thickness as it extends toward the tip end side in the wing span direction of the flap main body 11. In addition, the vortex suppressing portion 300 is formed such that an angle between a lower surface 301 and an upper-surface-side stepped surface 302 at the position of a side end surface 303 of the tip end portion of the flap main body 11 is 60° or smaller. When considered based on the flap main body 11' according to Conventional Example, the thickness of the vortex suppressing portion 300 is reduced by depressing downward the upper surface of the tip end portion of the flap main body 11' according to Conventional Example, that is, by scraping off the upper surface side of the tip end portion of the flap main body 11' according to Conventional Example. The lower surface 301 of the vortex suppressing portion 300 is not changed in shape from the flap main body 11' according to Conventional Example and is smoothly continuous with a wing-span-direction intermediate portion of the flap main body 11.

In a case where the cross-sectional shape of the flap main body 11 is changed as above, the area of the side end surface 303 decreases. Therefore, the area for the flow separation caused on the side end surface 303 decreases, so that the fluctuation in the vortex with time can be suppressed. In addition, the angle between the lower surface 301 and the upper-surface-side stepped surface 302 is maintained small. With this, it is possible to suppress a phenomenon in which the separation occurs before the flow reaches the end surface, and a practical separation region of the side end surface increases. Further, since the upper surface side of the tip end portion of the flap main body 11 is depressed downward, the vortex rolling up from the lower surface side of the flap main body 11 is physically separated from a surface that may interfere with the vortex, as compared to Conventional Example. Therefore, even in a case where the vortex rolls up from the lower surface side to the upper surface side at the tip end portion of the flap main body 11, the interference itself between the vortex and the flap main body 11 can be suppressed. On this account, the aerodynamic noises can be made smaller than those in conventional cases.

However, this configuration is just one example. For example, while changing the cross-sectional shape of the flap main body 11 such that the thickness of the tip end portion 11a of the flap main body 11 becomes small, the shape of the lower surface of the flap main body 11 may also be changed at the same time. In the example shown in FIGS. 5A and 5B, the thickness of the tip end portion 11a of the flap main body 11 gradually changes, and the stepped surface 302 extends like a curved line in cross-sectional view. With this, the turbulence of the air currents flowing along the upper surface of the flap main body 11 can be suppressed as much as possible. Of course, this is just one example, and the stepped surface 302 may extend like a straight line.

Example 4

Flow Suppressing Portion Provided on Upper Surface of Flap

Figure 6A:
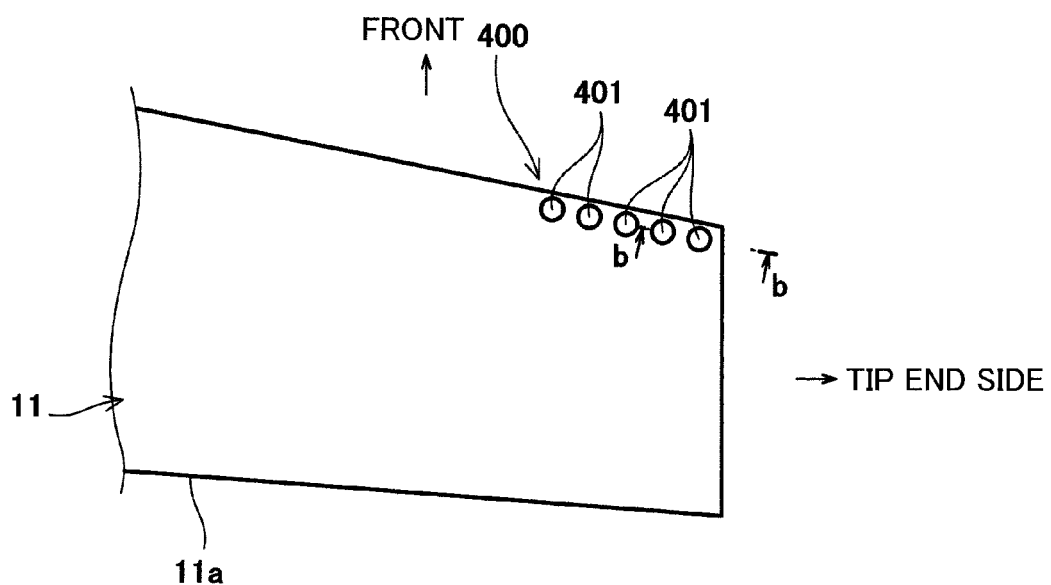
FIG. 6A is a partial plan view of the flap main body and shows the vortex suppressing portion according to Example 4 of the present invention.
Figure 6B:
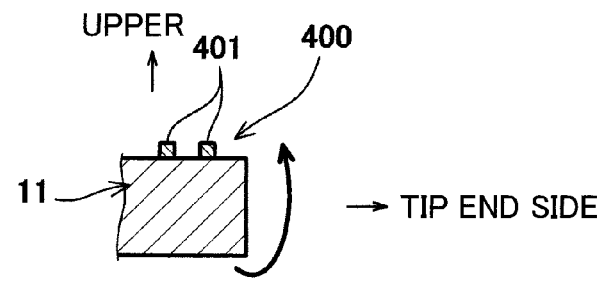
FIG. 6B is a partial cross-sectional view of the flap main body taken along line b-b of FIG. 6A.

FIG. 6A is a partial perspective view of the flap main body 11 to which a vortex suppressing portion 400 according to Example 4 is applied. FIG. 6B is a partial cross-sectional view of the flap main body 11 taken along line b-b of FIG. 6A. As shown in FIG. 6A, the vortex suppressing portion 400 includes flow suppressing portions 401. The flow suppressing portions 401 are constituted by a plurality of projections, and the projections are arranged at the leading edge portion of the upper surface of the tip end portion 11 of the flap main body 11 at intervals in the wing span direction of the flap main body 11. As shown in FIG. 6B, the flow suppressing portions 401 are provided so as to project upward from the upper surface of the flap main body 11.

Figure 6C:
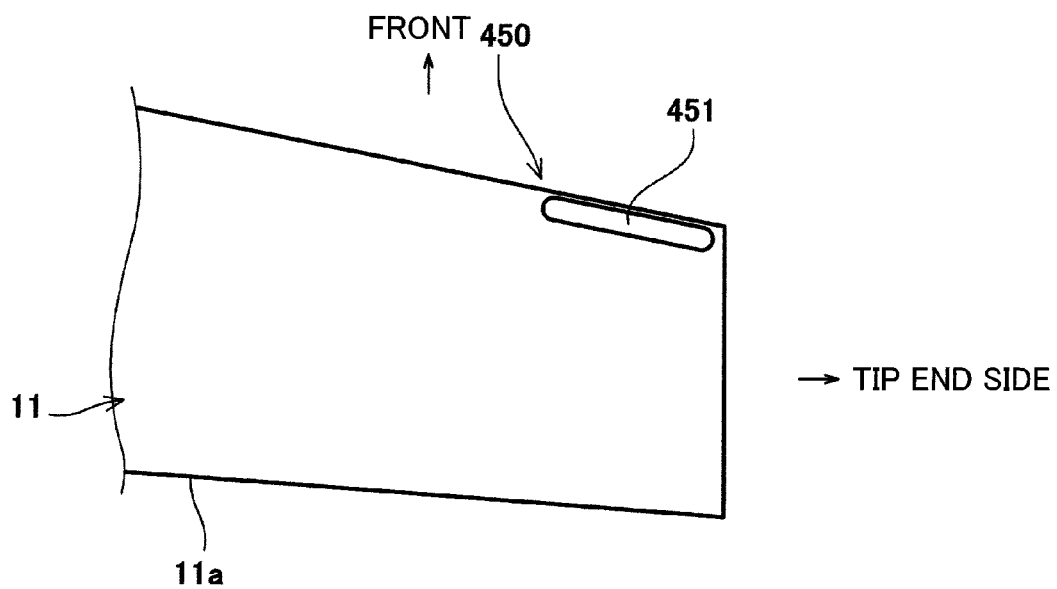
FIG. 6C is a partial plan view of the flap main body and shows the vortex suppressing portion according to Modification Example of Example 4 of the present invention.

According to this configuration, the air currents flowing from the leading edge of the flap main body 11 along the upper surface of the flap main body 11 are locally separated from the surface of the flap main body 11 by the flow suppressing portion 401. Therefore, the lift generated at the vortex suppressing portion 400 of the flap main body decreases, so that the strength of the vortex rolling up from the lower surface side to the upper surface side is suppressed. On this account, the aerodynamic noises are reduced. In the example shown in FIG. 6, the flow suppressing portions 401 are constituted by the projections. However, this is just one example, and the flow suppressing portion 401 may be formed in a plate shape, constituted by a step formed on the flap itself, or the like. FIG. 6C is a partial cross-sectional view of the flap main body and shows a vortex suppressing portion 450 according to Modification Example of Example 4. As shown in FIG. 6C, the vortex suppressing portion 450 includes a flow suppressing portion 451. The flow suppressing portion 451 is constituted by a plate-shaped projection, and the plate-shaped projection is arranged at the leading edge portion of the upper surface of the tip end portion 11 of the flap main body 11 and extends in the wing span direction of the flap main body 11. The flow suppressing portion 451 is formed by continuously integrating the plurality of projections shown in FIG. 6A in the wing span direction. As with the flow suppressing portions 401 shown in FIG. 6A, the flow suppressing portion 451 is provided so as to project upward from the upper surface of the flap main body 11. According to this configuration, the air currents flowing from the leading edge of the flap main body 11 along the upper surface of the flap main body 11 are easily separated from the surface of the flap main body 11. With this, the lift generated at the vortex suppressing portion 450 of the flap main body 11 decreases, so that the strength of the vortex rolling up from the lower surface side to the upper surface side can be suppressed. On this account, a more significant noise reduction effect than in the case shown in FIG. 6A can be obtained.

Example 5

Ventilation Structure and Cavity

Figure 7A:
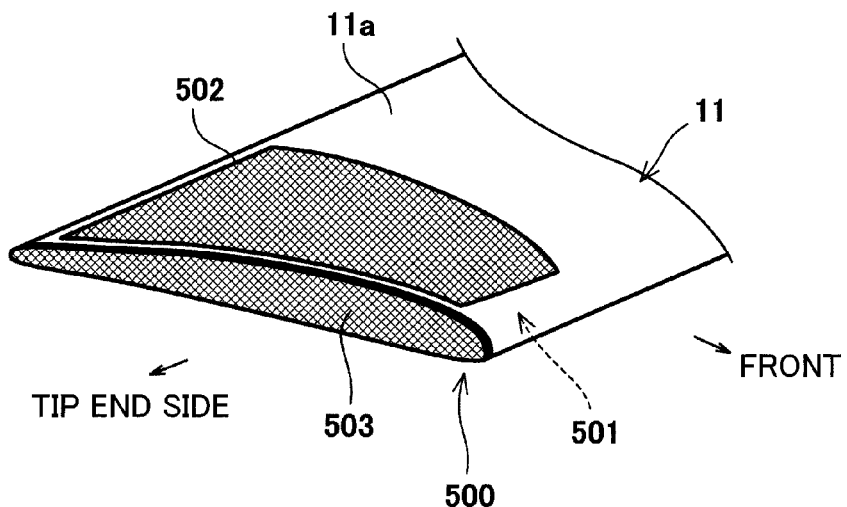
FIG. 7A is a partial perspective view of the flap main body and shows the vortex suppressing portion according to Example 5 of the present invention.
Figure 7B:
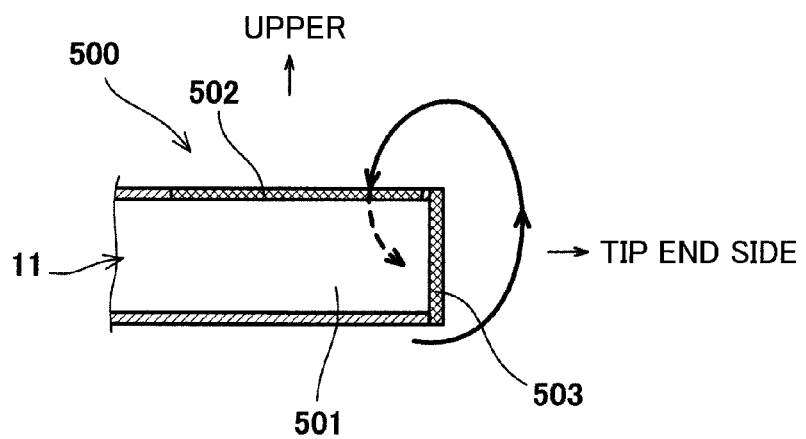
FIG. 7B is a partial cross-sectional view of the flap main body and shows the vortex suppressing portion according to Example 5 of the present invention.

FIG. 7A is a partial perspective view of the flap main body 11 to which a vortex suppressing portion 500 according to Example 5 is applied. FIG. 7B is a partial cross-sectional view of the vortex suppressing portion 500 shown in FIG. 7A. As shown in FIG. 7A, the vortex suppressing portion 500 includes a cavity 501, an upper surface ventilation structure 502, and a side surface ventilation structure 503. The cavity 501 is formed inside the tip end portion 11a of the flap main body 11. The upper surface ventilation structure 502 is provided so as to cover the upper surface of the tip end portion 11a of the flap main body 11 and constitutes an upper wall defining the cavity 501. The side surface ventilation structure 503 is provided so as to cover a side end portion of the tip end portion 11a of the flap main body 11 and constitutes a side wall defining the cavity 501. Each of the upper surface ventilation structure 502 and the side surface ventilation structure 503 is a mesh-like plate-shaped member or a porous plate member and is a ventilation structure that partially allows the flow of the air currents. To be specific, the cavity 501 is defined by the upper surface ventilation structure 502 and communicates with an outside on the upper surface side of the flap main body 11 through the upper surface ventilation structure 502. In addition, the cavity 501 is defined by the side surface ventilation structure 503 and communicates with an outside on the tip end side of the flap main body 11 through the side surface ventilation structure 503.

According to this configuration, pressure fluctuations are generated on the surface of the flap by the interference between the vortex rolling up from the lower surface side of the tip end portion 11a of the flap main body 11 and the surface of the flap. However, since the ventilation structures are provided at a position where the vortex tends to interfere with the flap main body 11, the interference between the vortex and the flap main body 11 is buffered or absorbed by the upper surface ventilation structure 502, the side surface ventilation structure 503, and the cavity 501. Therefore, the aerodynamic noises generated by the interference between the vortex and the flap main body 11 can be reduced.

Figure 7C:
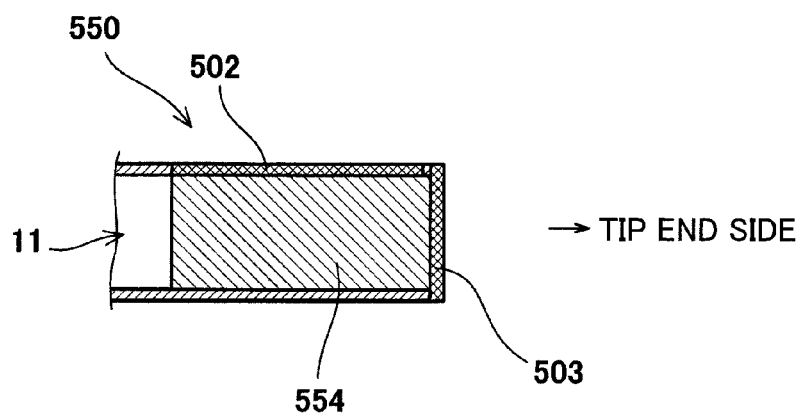
FIG. 7C is a partial cross-sectional view of the flap main body and shows the vortex suppressing portion according to Modification Example of Example 5 of the present invention.

FIG. 7C is a partial cross-sectional view of the flap main body and shows a vortex suppressing portion 550 according to Modification Example of Example 5. As shown in FIG. 7C, a porous material 554 may be provided in the cavity 501. With this, the energy of a fluid having flowed into the cavity 501 is favorably absorbed by the porous material. Therefore, a further significant noise reduction can be realized.

Example 6

Flow Suppressing Portion Provided at Lower Surface of Main Wing

Figure 8:
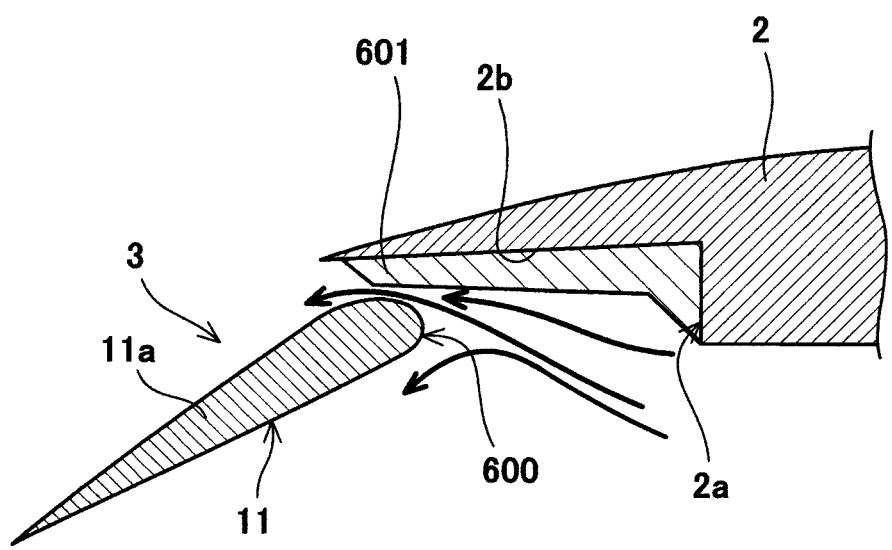
FIG. 8 is a cross-sectional view of a tip end portion of the flap main body and a main wing and shows the vortex suppressing portion according to Example 6 of the present invention.

FIG. 8 is a partial cross-sectional view of the tip end portion of the flap main body 11 to which a vortex sup-pressing portion 600 according to Example 6 is applied, and the main wing 3. As shown in FIG. 8, a recess 2a configured to retract the leading edge portion of the high-lift device is formed at the lower surface side of the trailing edge portion of the main wing 3. As shown in FIG. 8, the vortex suppressing portion 600 according to Example 6 includes an opposing portion formed at the leading edge of the tip end portion 11a of the flap main body 11. In a state where the high-lift device 3 is being extracted from the main wing 2, the opposing portion is close to and opposed to the lower surface of the trailing edge portion of the main wing 2 in the upper-lower direction. A projecting portion 601 projecting downward is provided on an upper surface 2b, defining the recess 2a, so as to be located at a position close to and opposed to the opposing portion of the flap main body 11. By providing the projecting portion 601, an opposing interval between the opposing portion and the main wing 3 can be suitably narrowed. According to this configuration, the narrow space between the opposing portion and the lower surface of the main wing 2 becomes resistance to the air currents flowing backward along the lower surface of the main wing 2. With this, the air currents flowing along the upper surface of the tip end portion 11a of the flap main body 11 are locally separated, so that the lift generated at the vortex suppressing portion of the flap main body decreases. With this, the strength of the vortex rolling up from the lower surface side to the upper surface side decreases, so that the aerodynamic noises are reduced.

Noise Reduction Effects of Examples

Figure 9:
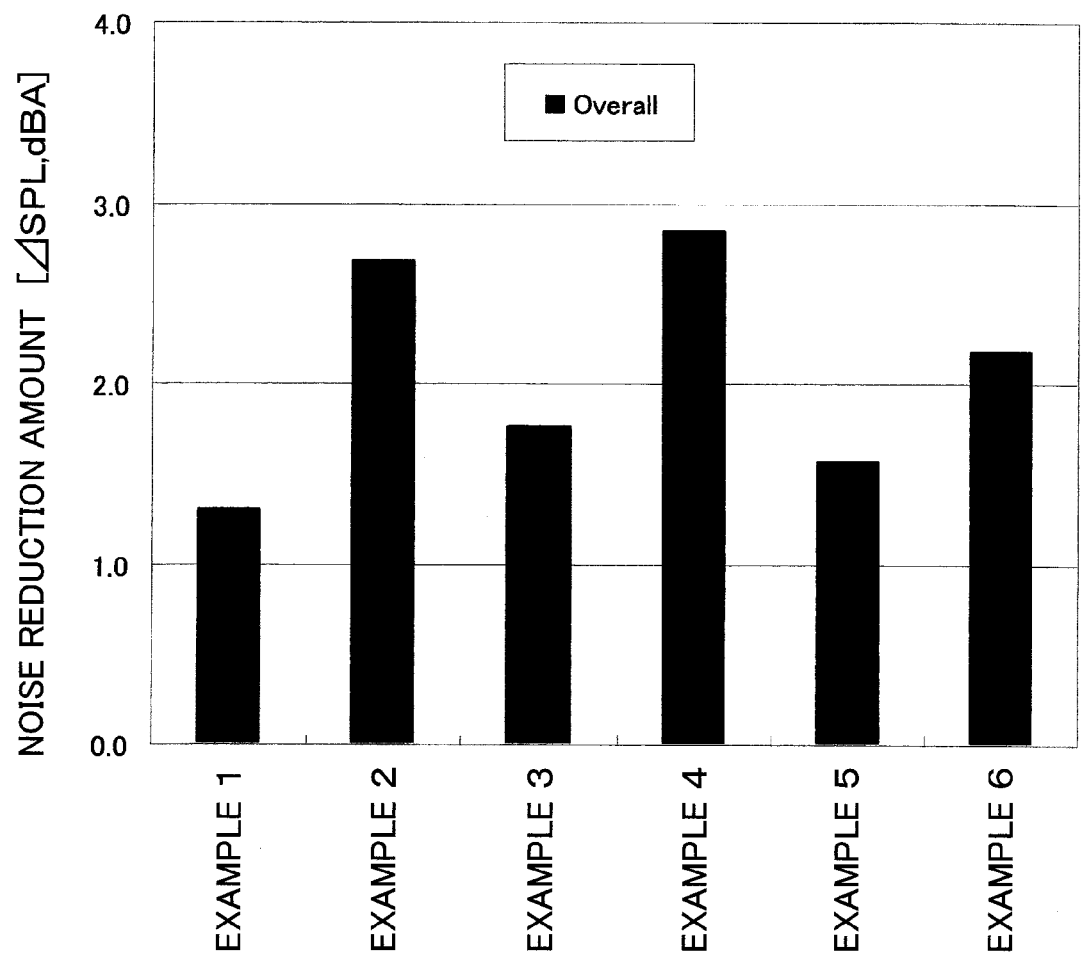
FIG. 9 is a bar graph showing noise reduction effects obtained by the vortex suppressing portions according to Examples 1 to 6.

FIG. 9 is a bar graph showing the noise reduction effects of the high-lift devices to which the vortex suppressing portions according to Examples 1 to 6 are respectively applied. To evaluate and verify the noise reduction effects of the vortex suppressing portions according to Examples 1 to 6, the present inventors have conducted wind tunnel model experiments. Sound pressure levels at the tip end portion 11a of the flap main body 11 in a plurality of frequency bands were measured in a case where the flight state is a state where the flight vehicle is about to land, and the angle of attack is 4°, 6°, or 8°. In FIG. 9, the noise reduction effects of the vortex suppressing portions according to Examples 1 to 6 are shown by overall values. The overall values are obtained in such a manner that measurements are converted into real-vehicle scale frequencies, and then a frequency weighting that is A weighting is applied to the frequencies.

As shown in FIG. 9, it became clear that each of the vortex suppressing portions according to Examples 1 to 6 has a high noise reduction effect unlike the high-lift device according to Conventional Example. Each of the vortex suppressing portions according to Examples 1 to 6 is formed by changing the shape of the tip end portion of the flap main body or the structure of the tip end portion of the flap main body. Unlike the conventionally proposed noise reduction devices, a large-scale device is not required. Therefore, the weight of the airframe of the flight vehicle increases little, and the practicality does not deteriorate.

The foregoing has explained the embodiment of the present invention. However, the above configurations may be suitably modified within the spirit of the present invention.

INDUSTRIAL APPLICABILITY

The present invention has an operational advantage of suitably reducing the aerodynamic noises generated from the high-lift device without increasing the weight of the airframe as much as possible and deteriorating the practicality.

Thus, it is useful to apply the present invention to the flight vehicle including the high-lift device.

REFERENCE SIGNS LIST 1 main wing
10 high-lift device
11 flap main body
100, 200, 300, 400, 500, 600 vortex suppressing portion

The invention claimed is:

1. A high-lift device of a flight vehicle, the high-lift device comprising:
a flap main body provided at a trailing portion of a main wing of the flight vehicle so as to be extracted from and be retracted in the trailing portion and extending in a wing span direction of the main wing; and
a vortex suppressing portion provided at a tip end portion of the flap main body in an extending direction of the flap main body and configured to suppress a vortex rolling up from a lower surface of the tip end portion of the flap main body to an upper surface of the tip end portion of the flap main body, wherein:
the vortex suppressing portion includes
a side surface ventilation structure provided at a side end surface of the tip end portion of the flap main body and
a cavity provided in the tip end portion of the flap main body; and
the side surface ventilation structure is provided so as to cover the entire side end surface of the tip end portion of the flap main body and constitutes a side wall defining cavity.

2. The high-lift device according to claim 1, wherein a porous material is provided in the cavity.

3. The high-lift device according to claim 1, wherein:
the vortex suppressing portion includes an upper surface ventilation structure provided so as to cover an upper end surface of the tip end portion of the flap main body and constituting an upper wall defining the cavity.

4. The high-lift device according to claim 1, wherein the side surface ventilation structure is continuous with the upper surface of the flap main body to form a corner together with the upper surface.

5. The high-lift device according to claim 3, wherein the lower surface of the flap main body does not include holes.

6. The high-lift device according to claim 3, wherein the upper surface ventilation structure is formed such that a size of the upper surface ventilation structure in the wing span direction increases toward a trailing edge of the upper surface ventilation structure.

7. A high-lift device of a flight vehicle, the high-lift device comprising:
a flap main body provided at a trailing portion of a main wing of the flight vehicle so as to be extracted from and be retracted in the trailing portion and extending in a wing span direction of the main wing; and
a vortex suppressing portion provided at a tip end portion of the flap main body in an extending direction of the flap main body and configured to suppress a vortex rolling up from a lower surface of the tip end portion of the flap main body to an upper surface of the tip end portion of the flap main body, wherein:
the vortex suppressing portion includes
a side surface ventilation structure provided at a side end surface of the tip end portion of the flap main body and
a cavity provided in the tip end portion of the flap main body; and
the side surface ventilation structure is continuous with the upper surface of the flap main body to form a corner together with the upper surface and constitutes a side wall defining the cavity.

8. A high-lift device of a flight vehicle, the high-lift device comprising:
a flap main body provided at a trailing portion of a main wing of the flight vehicle so as to be extracted from and be retracted in the trailing portion and extending in a wing span direction of the main wing; and
a vortex suppressing portion provided at a tip end portion of the flap main body in an extending direction of the flap main body and configured to suppress a vortex rolling up from a lower surface of the tip end portion of the flap main body to an upper surface of the tip end portion of the flap main body, wherein:
the vortex suppressing portion includes
an upper surface ventilation structure provided at an upper end surface of the tip end portion of the flap main body and
a cavity provided in the tip end portion of the flap main body; and
the upper surface ventilation structure is formed such that a size of the upper surface ventilation structure in the wing span direction increases toward a trailing edge of the upper surface ventilation structure, and the upper surface ventilation structure constitutes an upper wall defining the cavity.

* * * * *